(12) United States Patent
Sung et al.

(10) Patent No.: US 8,279,744 B2
(45) Date of Patent: Oct. 2, 2012

(54) METHOD OF SELECTING ANTENNAS AND TRANSMITTING DATA IN MULTI-INPUT MULTI-OUTPUT WIRELESS LOCAL AREA NETWORK ENVIRONMENTS

(75) Inventors: Dan Keun Sung, Daejeon (KR); Bang Chul Jung, Seoul (KR)

(73) Assignee: Pantech Co., Ltd., Seoul (KR)

( * ) Notice: Subject to any disclaimer, the term of this patent is extended or adjusted under 35 U.S.C. 154(b) by 380 days.

(21) Appl. No.: 12/599,463

(22) PCT Filed: May 9, 2008

(86) PCT No.: PCT/KR2008/002606
§ 371 (c)(1),
(2), (4) Date: Nov. 9, 2009

(87) PCT Pub. No.: WO2008/140216
PCT Pub. Date: Nov. 20, 2008

(65) Prior Publication Data
US 2010/0246546 A1    Sep. 30, 2010

(30) Foreign Application Priority Data

May 11, 2007  (KR) ................. 10-2007-0045848

(51) Int. Cl.
*H04J 11/00* (2006.01)
*H04B 7/185* (2006.01)
(52) U.S. Cl. ................. 370/208; 370/334; 455/13.3
(58) Field of Classification Search .......... None
See application file for complete search history.

(56) References Cited

U.S. PATENT DOCUMENTS

| 2004/0082356 A1* | 4/2004 | Walton et al. ................. 455/522 |
| 2005/0075081 A1* | 4/2005 | Catreux-Erceg et al. ....... 455/78 |
| 2005/0239510 A1* | 10/2005 | Cho et al. .................. 455/562.1 |
| 2006/0209667 A1* | 9/2006 | Li ................................ 370/203 |

(Continued)

FOREIGN PATENT DOCUMENTS

JP    2006-238423    9/2006

(Continued)

OTHER PUBLICATIONS

Mohinder Jankiraman, "Space-Time codes and MIMO Systerns-{Artech House universal personal communications library)" pp. 20-23, published in 2004 Artech House, Inc. at MA, USA. No later than Dec. 2004.

*Primary Examiner* — Andrew Chriss
(74) *Attorney, Agent, or Firm* — H. C. Park & Associates, PLC

(57) ABSTRACT

In a Multiple-Input Multiple-Output (MIMO) wireless local area network (WLAN) system, a method is provided for selecting at least one antenna from a plurality of antennas and transmitting a data frame from a station to an access point via the selected antenna or antennas. A method for transmitting data from a plurality of stations to an access point in the MIMO WLAN system includes detecting a channel status of a channel from the access point to each transmitting antenna of the station, selecting at least one transmitting antenna from among the station's transmitting antennas based on the detected channel status, and transmitting a data frame from the station to the access point via the selected transmitting antenna or antennas.

13 Claims, 3 Drawing Sheets

U.S. PATENT DOCUMENTS

| | | |
|---|---|---|
| 2006/0209732 A1 | 9/2006 | Gorokhov et al. |
| 2006/0234776 A1 | 10/2006 | Ishihara et al. |
| 2006/0291582 A1* | 12/2006 | Walton et al. ............ 375/267 |
| 2009/0290563 A1* | 11/2009 | Gu et al. ............ 370/338 |

FOREIGN PATENT DOCUMENTS

| | | |
|---|---|---|
| JP | 2007-013547 | 1/2007 |
| KR | 1020000055790 | 9/2000 |
| KR | 1020010036597 | 5/2001 |
| KR | 1020030070714 | 9/2003 |
| KR | 1020040038327 | 5/2004 |
| KR | 1020050066633 | 6/2005 |
| KR | 1020050101111 | 10/2005 |
| KR | 100675205 | 1/2007 |
| KR | 100818630 | 3/2008 |
| WO | 2005/099103 | 10/2005 |
| WO | 2006/075661 | 7/2006 |
| WO | 2006/106613 | 10/2006 |

* cited by examiner

METHOD OF SELECTING ANTENNAS AND TRANSMITTING DATA IN MULTI-INPUT MULTI-OUTPUT WIRELESS LOCAL AREA NETWORK ENVIRONMENTS

CROSS-REFERENCE TO RELATED APPLICATIONS

This application is the National Stage of International Application No. PCT/KR2008/002606, filed May 9, 2008, and claims priority from and the benefit of Korean Patent Application No. 10-2007-0045848, filed on May 11, 2007, which are both hereby incorporated by reference for all purposes as if fully set forth herein.

BACKGROUND OF THE INVENTION

1. Field of the Invention

The present invention relates to a Multiple-Input Multiple-Output (MIMO) wireless local area network (WLAN) system, and more particularly, to a method for selecting at least one antenna from a plurality of antennas and transmitting a data frame via the selected antenna or antennas.

2. Discussion of the Background

A WLAN is a short distance communication network where signals can be transmitted wirelessly between nodes, such as stations and an access point. The WLAN can improve the readiness and extensibility of a wired LAN, can reduce the cost of operating and maintaining an LAN, and can provide users with a more convenient network access environment.

Currently, the usage of various types of portable devices, such as portable digital assistants (PDAs), portable media players (PMPs), tablet personal computers (PCs), and the like is expanding. As the use of portable devices increases, users' demands for network connection functions using the portable devices are also increasing, thus making the WLAN an attractive option.

A representative standard associated with the WLAN is the Institute of Electrical and Electronics Engineers (IEEE) 802.11 Wireless Fidelity (Wi-Fi) standard. Since the IEEE 802.11 standard was initially released in 1997, the IEEE 802.11 standard has been the base of various extensions such as 11a, 11b, and 11g. In order to support higher performance, 802.11n is currently being standardized.

The IEEE 802.11n standard adopts an MIMO system configuration scheme to support high data rates in the physical layer. In the MIMO scheme, a transmitting end can transmit data via multiple transmitting antennas, the data may pass through various types of paths, and a receiving end can detect the data using the signals that are received from the various paths via multiple receiving antennas. Through this, the MIMO scheme can improve data rates and reduce interference that may occur in a multi-path environment.

Therefore, in an IEEE 802.11n WLAN environment, stations and an access point each have multiple antennas. Through the above configuration, in comparison to existing versions, it is possible to support an improved data rate in the physical layer.

The Korean Patent Application No. 10-2006-97537 relates to a MIMO WLAN system. FIG. 1 illustrates a general configuration of the MIMO WLAN system described in the above application. Referring to FIG. 1, the MIMO WLAN system includes multiple stations 110 and 120, and an access point 130 that receives data from the stations 110 and 120, which is the same as a general WLAN system.

The difference between the MIMO WLAN system and the general WLAN system is that in the MIMO WLAN system, each station and access point includes multiple antennas. Thus, the first station 110 includes multiple transmitting antennas 111 and 112, the second station 120 includes multiple transmitting antennas 121 and 122, and the access point 130 includes multiple receiving antennas 131, 132, 133, and 134. The stations 110 and 120 can respectively transmit data via the transmitting antennas 111, 112, 121, and 122 through different paths. The access point 130 may receive signals transmitted through different paths via the receiving antennas 131, 132, 133, and 134.

Unlike the arrangement shown in FIG. 1, the general WLAN system may be arranged such that each station includes two transmitting antennas and an access point also includes only two receiving antennas. Thus, each station transmits data via the two transmitting antennas, and the access point receives the data from each station via the two receiving antennas. If the two stations simultaneously transmit data, four data streams can reach the access point simultaneously. In this case, a data collision may occur and the access point's two receiving antennas may not be able to discriminate among the four data streams. As described above, in the general WLAN system, if the receiving end includes a fewer number of antennas than a number of independent data streams from the transmitting end, the receiving performance may be significantly degraded.

Accordingly, a new technology is proposed to improve the data throughput by adopting a selective diversity scheme to multiple antennas.

SUMMARY OF THE INVENTION

Embodiments of the present invention may improve the data throughput by applying an antenna diversity scheme.

Embodiments of the present invention may reduce system embodiment costs by transmitting and receiving data using a fewer number of radio frequency (RF) chains than the number of receiving antennas.

Embodiments of the present invention may reduce data collisions that may occur between Media Access Control (MAC) layers in an MIMO system.

According to an exemplary embodiment of the present invention, a method for transmitting data from a plurality of stations to an access point is provided. The method includes detecting, by each station, a channel status of a channel from the access point to each of a plurality of transmitting antennas of the station; selecting, by each station, at least one transmitting antenna from the plurality of transmitting antennas based on the detected channel status; and transmitting, by each station, a data frame to the access point via the selected transmitting antenna.

DETAILED DESCRIPTION OF THE ILLUSTRATED EMBODIMENTS

Figure 1:
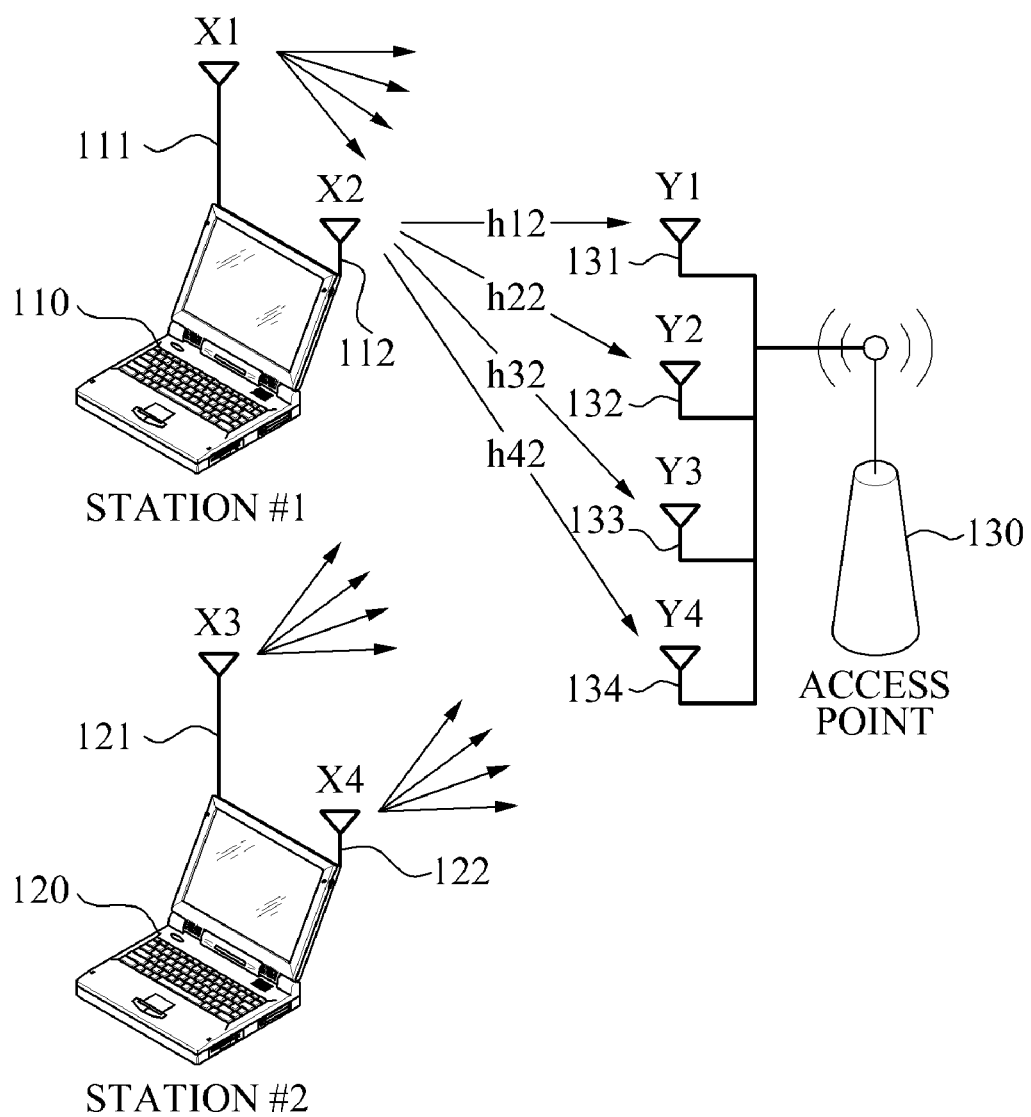
FIG. 1 illustrates a configuration of an MIMO WLAN system.

Reference will now be made in detail to the present invention's exemplary embodiments, which are illustrated in the accompanying drawings, and in which like reference numerals refer to the like elements throughout. The exemplary embodiments are described below in reference to the figures.

Hereinafter, a method for transmitting and receiving data in an MIMO WLAN system using the method according to the exemplary embodiments of the present invention will be described with reference to the accompanying drawings.

According to the exemplary embodiments of the present invention, each station may include multiple transmitting antennas and select at least one transmitting antenna from the multiple transmitting antennas for transmission of data to the access point. Therefore, it is possible to reduce performance degradation that may occur due to data collisions.

For example, according to one exemplary embodiment each station may include two transmitting antennas, and an access point may include two receiving antennas. Then, if each station transmits data via only one of its two transmitting antennas, each station transmits data via a single transmitting antenna and the access point receives the data via its two receiving antennas. If two stations transmit data simultaneously, two data streams may reach the access point at the same time. However, since the access point includes a number of receiving antennas that is not less than the number of independent data streams, the access point may recover the data streams despite the collision.

Figure 2:
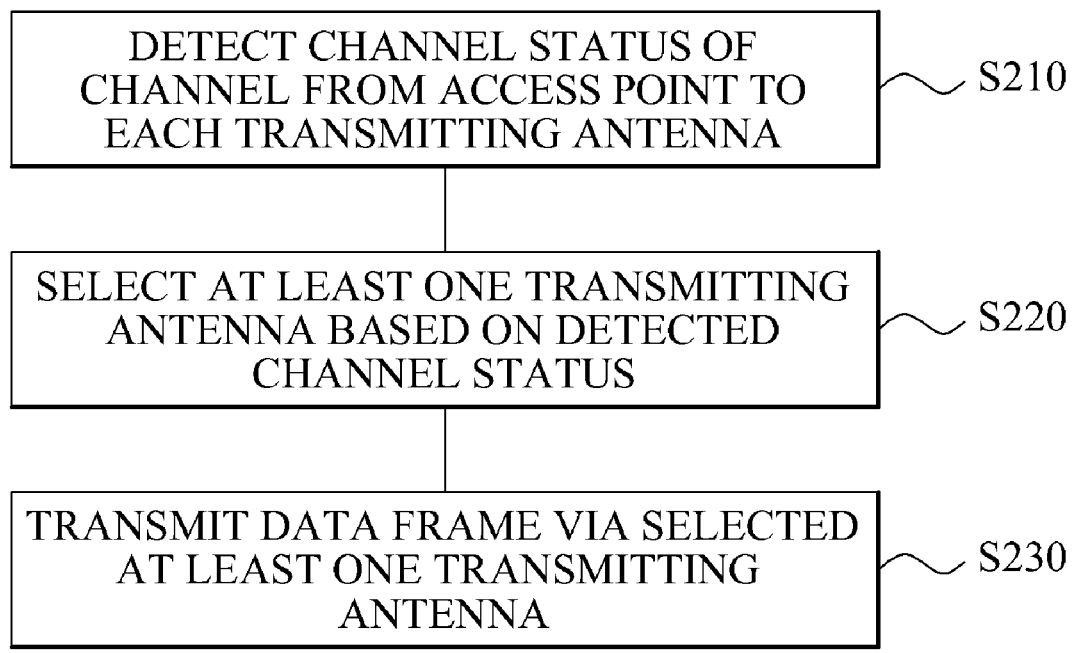
FIG. 2 is a flowchart illustrating a method for transmitting data from a station to an access point in a MIMO WLAN system according to an embodiment of the present invention.

FIG. 2 is a flowchart illustrating a method for transmitting data from a station to an access point in a MIMO WLAN system according to an embodiment of the present invention. Hereinafter, the method will be described in detail with reference to FIG. 2.

In operation S210, the station detects the channel status of a channel from the access point to each of the station's multiple transmitting antennas.

For example, the channel gain of the channel may be calculated to detect the channel status. In the case of a radio channel, because of multi-path fading, the channel gain may change over time or according to topography. The channel status for each antenna may be independent. In this situation, if both the transmitting end and the receiving end track the channel status of each channel and are aware of the channel status for each antenna, the station may select an antenna with the best channel gain at a particular communication point in time and attempt the communication.

Also, the channel status may be detected by a station based on a pilot signal received from the access point. In particular, in a reciprocal communication system, for example, a time division duplexing (TDD) system, with the same uplink and downlink characteristics, if the station transmits data via the uplink using the received pilot signal for each antenna, the station may select an antenna based on the received pilot signal for each antenna. The above scheme may be applicable to a WLAN system.

Also, the access point may generate a beacon signal and transmit the generated beacon signal to each station so that the station may determine the channel status associated with an antenna. For example, it is possible to generate an orthogonal or quasi-orthogonal pilot signal for each antenna and transmit the generated pilot signal to each station.

An example of transmitting the pilot signal may use at least one of a scheme of inserting a pilot signal for each antenna into each beacon signal, a scheme of inserting the pilot signal for each antenna into each beacon signal with changing the beacon signal, and a scheme of adjusting a number of pilot signals to be inserted into the beacon signal to reduce signaling overhead. The pilot signal for each antenna may be identified based on an orthogonal code, a quasi-orthogonal code, an orthogonal time, an orthogonal frequency, and the like.

In operation S220, each station selects at least one transmitting antenna from its transmitting antennas based on the detected channel status.

For example, each station may identify the channel status for each transmitting antenna and select a transmitting antenna with the best channel status.

In operation S230, a station transmits a data frame to the access point via the selected transmitting antenna.

Even if each station selects at least one transmitting antenna with the best channel status from among its transmitting antennas and transmits data via the selected transmitting antenna or antennas and a collision occurs, the access point may discriminate among the independent data streams and identify the data.

Specifically, even if the collision probability is relatively high due to a large number of stations, each station may adaptively adjust the number of transmitting antennas.

As described above, according to an exemplary embodiment of the present invention, in a MIMO communication system, a transmitting side may selectively use a predetermined number of antennas from among multiple available antennas and transmit data via the selected predetermined number of antennas. Therefore, it is possible to embody selection diversity among diversity combining schemes.

Also, an example of antenna scanning for detecting the channel status to select an antenna may include measuring the maximum data rate of a channel. Specifically, while automatically and iteratively changing the data rate of the channel for each antenna, for example, when increasing or decreasing the data rate, each station may measure the available maximum data rate and select a predetermined number of antennas with the maximum data rate. Whether to perform the antenna scanning process may be determined based on the channel status associated with the corresponding station and whether transmission traffic exists. Also, when performing the antenna scanning process, it is possible to periodically measure the maximum data rate. If the channel status changes over time based on the periodical measurement, it is possible to improve the performance by selecting a different number of antennas based on the channel status.

According to an exemplary embodiment of the present invention, an operation of inserting, by each station, antenna selection information associated with the selected antenna or antennas into header information of a data frame and transmitting the data frame to the access point may be performed. Specifically, once a station selects an antenna or antennas, antenna selection information may be included in the header information and be transmitted, so that the access point may receive the antenna selection information.

According to an exemplary embodiment of the present invention, an RF chain such as an Orthogonal Frequency Division Multiplexing (OFDM) modulator, a digital processing unit, a receiver, and the like may be shared by a number of antennas through switching. Through this, it is possible to simplify the configuration of a hardware device and thereby reduce manufacturing costs.

In the above-described embodiment with reference to FIG. 2, each station detects the channel status by itself to select an antenna. However, according to another exemplary embodiment of the present invention, the access point may affect the antenna selection in each station.

Also, according to another exemplary embodiment of the present invention, a method for transmitting data from a station to an access point in a MIMO WLAN system may include selecting at least one transmitting antenna set from multiple transmitting antennas of the station, and transmitting a data frame to the access point via the selected transmitting antennas set or sets.

If each station selects one or more transmitting antenna sets, the transmitting antenna set or sets may be selected based on a number of transmitting antennas that is determined by the access point for each station. Specifically, the access point may determine the maximum number of independent data streams, which maximum number is generated for transmission to each station positioned in the coverage of the access point. The access point may then use a beacon signal to transmit the maximum number to each station. After the maximum number of available antennas is determined, each station may improve the frequency efficiency by applying a Space Time Bock Coding (STBC) scheme, a spatial multiplexing (SM) scheme, a beamforming (BF) scheme, and the like with respect to the antenna or antennas of the selected transmitting antenna set or sets.

If the access point determines the number of antennas that can be used in each station, the access point may base the number of antennas on the number of stations that open a data communication session with the access point. Also, the access point may use the data frame collision probability between multiple stations, or may use a frame error rate (FER) to determine the number of antennas that can be used in each station.

As described above, according to an exemplary embodiment of the present invention, the access point may generate a beacon signal and may transmit the generated beacon signal to each station so that the station may detect of the channel status. Also, a pilot signal may be inserted into only a particular beacon signal, i.e. a beacon signal that is predetermined among beacon signals that are transmitted from the access point. The pilot signal may be used if the access point determines the number of available antennas in the station.

Since the pilot signal itself may be overhead in the system, it may be advantageous in an exemplary embodiment of the performance to insert a fewer number of pilot signals into a beacon signal. Therefore, the access point may adjust the number of pilot signals inserted into the beacon signal based on the number of stations, the moving speed of each station, the data traffic load, or a combination of these or other factors. For example, if the user mobility is negligible and the number of users is small, the determined channel status may not change significantly. However, if the moving speed or the number of users increases, the change in the channel status may be more significant. Therefore, it is possible to adaptively insert the predetermined number of pilot signals based on the channel status to reduce overhead of the system.

According to an exemplary embodiment of the present invention, the number of pilot signals to be inserted into the beacon signal may be determined based on a request received from each station. According to another exemplary embodiment of the present invention, in the selection of the transmitting antenna set, each station may randomly select the predetermined number of transmitting antenna sets from the multiple transmitting antennas of the station.

If the number of available antennas is determined based on the beacon signal, each station may select an antenna set corresponding to the determined number of available antennas from a given number of antennas. Hereinafter, examples of selection criteria will be described.

Initially, the capacity of the selected antenna set may be calculated according to Shannon's channel capacity equation, and an antenna set may be selected corresponding to the maximum value.

If a single transmitting antenna and a single receiving antenna exist, the channel capacity equation may be represented as, $$C = B \cdot \log_2(1+\text{SNR}),$$

where B denotes the whole system bandwidth and SNR denotes the signal-to-noise ratio. In the MIMO environment where multiple transmitting antennas and multiple receiving antennas exists, the channel capacity equation may be represented as, $$C = B \cdot \log_2 \det\left(I + \frac{1}{N_0} H K_x H^H\right),$$

where I denotes an identity matrix, H denotes the MIMO matrix, and Kx denotes the covariance matrix of power that the transmitting end allocates to each antenna.

Also, it is possible to select an antenna set that has a maximum signal-to-interference and noise ratio (SINR) value for each antenna.

The IEEE standard specifies a physical layer adopting an OFDM scheme. The OFDM scheme or an Orthogonal Frequency Division Multiple Access (OFDMA) scheme is a modulation scheme that can compensate for distortion occurring in a multi-path channel. The OFDM scheme or the OFDMA scheme transmits data using multiple subcarriers that have mutual orthogonality, which is different from a transmission scheme using a single carrier. Specifically, the OFDM scheme may perform serial-to-parallel conversion as many times as a number of subcarriers used for modulating data and may modulate each converted data using a corresponding subcarrier. Accordingly, the OFDM scheme may extend a symbol period of each subcarrier by the number of subcarriers, thus maintaining the data rate. Since the OFDM scheme uses the subcarriers with the mutual orthogonality, the OFDM scheme may improve the bandwidth efficiency and extend the symbol period in comparison to a conventional Frequency Division Multiplexing (FDM) scheme. Therefore, in comparison to a single subcarrier modulation scheme, the OFDM scheme may reduce or minimize inter-symbol interference (ISI).

Herein, exemplary embodiments of the present invention are described to implement antenna diversity if using OFDM at a physical layer.

According to an exemplary embodiment of the present invention, a MIMO WLAN system may include an access point with multiple receiving antennas and multiple stations transmitting data to the access point via multiple transmitting antennas.

The WLAN system may use the OFDM as the physical layer. Each station may select an antenna for each subband and transmit a data frame to the access point via the selected antenna.

Specifically, when determining a predetermined number of antennas from multiple transmitting antennas, it is possible to select an antenna for each subcarrier or for each subband corresponding to a set of adjacent subcarriers. Specifically, it is possible to transmit data with changing the antenna for each particular subband. The data may be transmitted via the selected antenna according to a transmission scheme such as an STBC scheme, an SM scheme, a BF scheme, and the like.

An antenna may be selected based on the average channel gain of all the subcarriers. However, in a frequency-selective fading environment, the channel status may significantly change for each subband or for each subcarrier. Therefore, if the antenna is selected for each subband, the additional gain may be obtained.

Also, each station may select the antenna based on the average channel gain of the subband. Also, each station may select the antenna based on the average channel gain of all the sub-carriers and use the selected antenna for the entire band. Also, each station may randomly select the number of available antennas for each subband.

According to another exemplary embodiment of the present invention, the access point may insert a pilot signal into a beacon signal, so that each station may estimate the channel status for each subband or for each subcarrier. The pilot signal may be orthogonal or quasi-orthogonal for each transmitting antenna. Also, the pilot signal may be orthogonal or quasi-orthogonal with respect to a pilot signal for channel estimation that is simultaneously transmitted from another station. Through this, the channel estimation may be accurately performed in the access point, which may operate a MIMO receiver.

Also, a predetermined signal scheme may be used to inform the access point of the antenna that is selected by the station for each subband. For example, a scheme of adding an index based on a frame header may be used. In this instance, since a different antenna is used for each subband, the number of indices matches the number of subbands. Each station informs the access point of pilot signals associated with all the antennas of the station. Therefore, although a selected number of antennas is used for data transmission, the same number of pilot signals for channel estimation as the number of all the antennas is transmitted.

Figure 3:
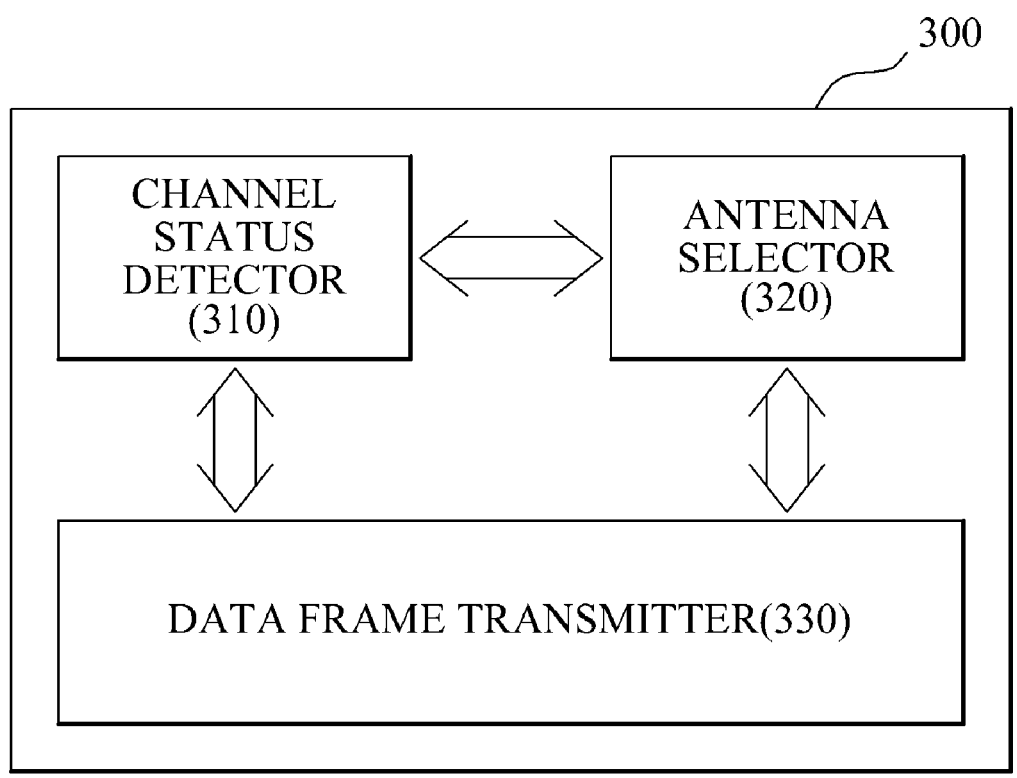
FIG. 3 is a block diagram illustrating an internal configuration of a station apparatus according to an embodiment of the present invention.

FIG. 3 is a block diagram illustrating an internal configuration of a station apparatus 300 for a MIMO WLAN system according to an embodiment of the present invention.

The station apparatus 300 may include a channel status detector 310, an antenna selector 320, and a data frame transmitter 330. Hereinafter, the function of each component will be described in more detail.

The channel status detector 310 may detect the channel status of a channel from an access point to each of the multiple transmitting antennas of each station. For example, the channel status detector 310 may calculate the channel gain or measure the data rate to detect the channel status. Also, the channel status detector 310 may detect the channel status using a pilot signal received from the access point.

The antenna selector 320 may select at least one transmitting antenna from multiple transmitting antennas based on the detected channel status. Also, the antenna selector 320 may select at least one transmitting antenna based on the number of antennas determined by the access point. Also, when determining the number of transmitting antennas, the antenna selector 320 may use a number of stations that open a data communication session with the access point, or a data collision probability between multiple stations.

The data frame transmitter 330 may transmit a data frame to the access point via the selected transmitting antenna or antennas.

The configuration of the station apparatus 300 has been described above with reference to FIG. 3. Descriptions made with reference to FIG. 2 may be applicable to the station apparatus 300. Therefore, further detailed descriptions related thereto will be omitted here.

A data transmission method according to the exemplary embodiments of the present invention may improve the data throughput by applying an antenna diversity scheme.

Also, according to the exemplary embodiments of the present invention, system embodiment costs may be reduced by simplifying the hardware structure of the RF chain.

Also, according to the exemplary embodiments of the present invention, data collisions between Media Access Control (MAC) layers in the MIMO system may be reduced.

Although a few exemplary embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for transmitting data to an access point in a Multiple-Input Multiple-Output (MIMO) wireless local area network (WLAN) system, the method comprising:
   detecting a channel status of a channel from the access point to a first transmitting antenna and a second transmitting antenna of a first station;
   selecting the first transmitting antenna based on the detected channel status;
   inserting antenna selection information associated with the first transmitting antenna to header information of a data frame; and
   transmitting the data frame from the first station to the access point via the first transmitting antenna,
   wherein the selection of the first transmitting antenna is further based upon a determination of the access point.

2. The method of claim 1, wherein the detecting comprises calculating a channel gain of the channel.

3. The method of claim 1, wherein the channel status is detected using a pilot signal received from the access point.

4. The method of claim 1, wherein the detecting comprises measuring a maximum data rate of the channel.

5. The method of claim 4, wherein the measuring measures the maximum data rate while at least the first station iteratively changes a data rate of the channel.

6. The method of claim 4, wherein the maximum data rate is periodically measured.

7. A method for transmitting data to an access point in a Multiple-Input Multiple-Output (MIMO) wireless local area network (WLAN) system, the method comprising:
   selecting at least one transmitting antenna set from a plurality of transmitting antennas of a first station; and
   transmitting a data frame from the first station to the access point via the at least one transmitting antenna set,
   wherein the at least one transmitting antenna set comprises fewer transmitting antennas than the plurality of transmitting antennas of the first station, and
   wherein the at least one transmitting antenna set is selected based on a number of transmitting antennas that is determined by the access point.

8. The method of claim 7, wherein the number of transmitting antennas is determined based on a number of stations that open a data communication session with the access point.

9. The method of claim 7, wherein the number of transmitting antennas is determined based on a data collision probability between the plurality of stations.

10. The method of claim 7, wherein the number of transmitting antennas is determined based on a frame error rate (FER).

11. The method of claim 7, wherein the at least one transmitting antenna set has a maximum channel capacity among the plurality of transmitting antennas.

12. The method of claim 7, wherein the at least one transmitting antenna set is selected randomly.

13. The method of claim 7, further comprising:
inserting a pilot signal into a generated beacon signal; and
transmitting the generated beacon signal from the access point to at least the first station,
wherein the access point adjusts a number of pilot signals to be inserted to the beacon signal based on at least one of a number of stations, a moving speed of each station, and data traffic load.

* * * * *